US012726480B2

(12) United States Patent
Ambastha et al.

(10) Patent No.: US 12,726,480 B2
(45) Date of Patent: Sep. 1, 2026

(54) USING HIDDEN FIELDS FOR BOT DETECTION

(71) Applicant: OKTA, INC., San Francisco, CA (US)

(72) Inventors: Abhishek Ambastha, Toronto (CA); Miranda Clay, North Bethesda, MD (US); Kyle Traff, Longmont, CO (US); Emiliano Jose Fausto, Stockholm (SE); Andrew Wayne Riley, Taylor, MI (US); George Andrew Vauter, Westfield, IN (US); Brian Victor Dumbleton, Kitchener (CA)

( * ) Notice: Subject to any disclaimer, the term of this patent is extended or adjusted under 35 U.S.C. 154(b) by 298 days.

(21) Appl. No.: 18/361,432

(22) Filed: Jul. 28, 2023

(65) Prior Publication Data

US 2025/0039174 A1 Jan. 30, 2025

(51) Int. Cl.
*H04L 9/40* (2022.01)

(52) U.S. Cl.
CPC .......... *H04L 63/0876* (2013.01); *H04L 63/10* (2013.01); *H04L 2463/144* (2013.01)

(58) Field of Classification Search
CPC ................. H04L 63/0876; H04L 63/10; H04L 2436/144
See application file for complete search history.

(56) References Cited

U.S. PATENT DOCUMENTS

2012/0117649 A1* 5/2012 Holloway ............. H04L 67/568 726/24
2014/0298444 A1* 10/2014 Iwamatsu ........... H04L 63/0281 726/12
2019/0253251 A1* 8/2019 Kobayashi ............ H04L 9/3247

* cited by examiner

*Primary Examiner* — Khoi V Le
(74) *Attorney, Agent, or Firm* — Holland & Hart LLP

(57) ABSTRACT

An identity management platform may transmit, to an Internet Protocol (IP) address associated with a request to access resources protected by the identity management platform, data corresponding to a login page. The data may include login fields that are detectable when the login page is rendered and at least one hidden field that is undetectable when the login page is rendered. The identity management platform may receive, from the IP address, a login response with a first set of inputs corresponding to the detectable login fields and a second set of inputs corresponding to the at least one hidden field that is undetectable when the login page is rendered. The identity management platform may determine that the IP address corresponds to an unauthorized entity based on the login response including the second set of inputs for the at least one hidden field in the login page.

16 Claims, 8 Drawing Sheets

Untrusted IP Addresses
IP Address
IP Address
IP Address 230-a
Data Center 120
Login Response 225-a
Login Response 225-b
Authentication Service 135
Application 110-a
225-a
Login Response
IP Address 230-a
Input 235-a
Input 235-b
Network 130
225-b
Login Response
IP Address 230-b
Input 235-c
Login Page 215
Viewable Fields 220-a
Hidden Field 220-b
105-a
105-b
210
205
200

USING HIDDEN FIELDS FOR BOT DETECTION

FIELD OF TECHNOLOGY

The present disclosure relates generally to identity management and user authentication, and more specifically to using hidden fields for bot detection.

BACKGROUND

Some applications, services, and organizations may use a cloud-based identity management platform to provide secure user authentication and authorization services. The identity management platform may simplify user identity management and access to different resources within an organization. The identity management platform may use various cryptographic techniques, threat detection, and monitoring techniques to ensure the integrity and confidentiality of user information. In some cases, the identity management platform may block or otherwise restrict access from devices or users that are associated with malicious behavior, spam, hacking attempts, etc. However, determining whether a new or unknown device corresponds to a legitimate user or an unauthorized entity (such as a bot or attacker) presents several technical challenges.

DETAILED DESCRIPTION

Figure 1:
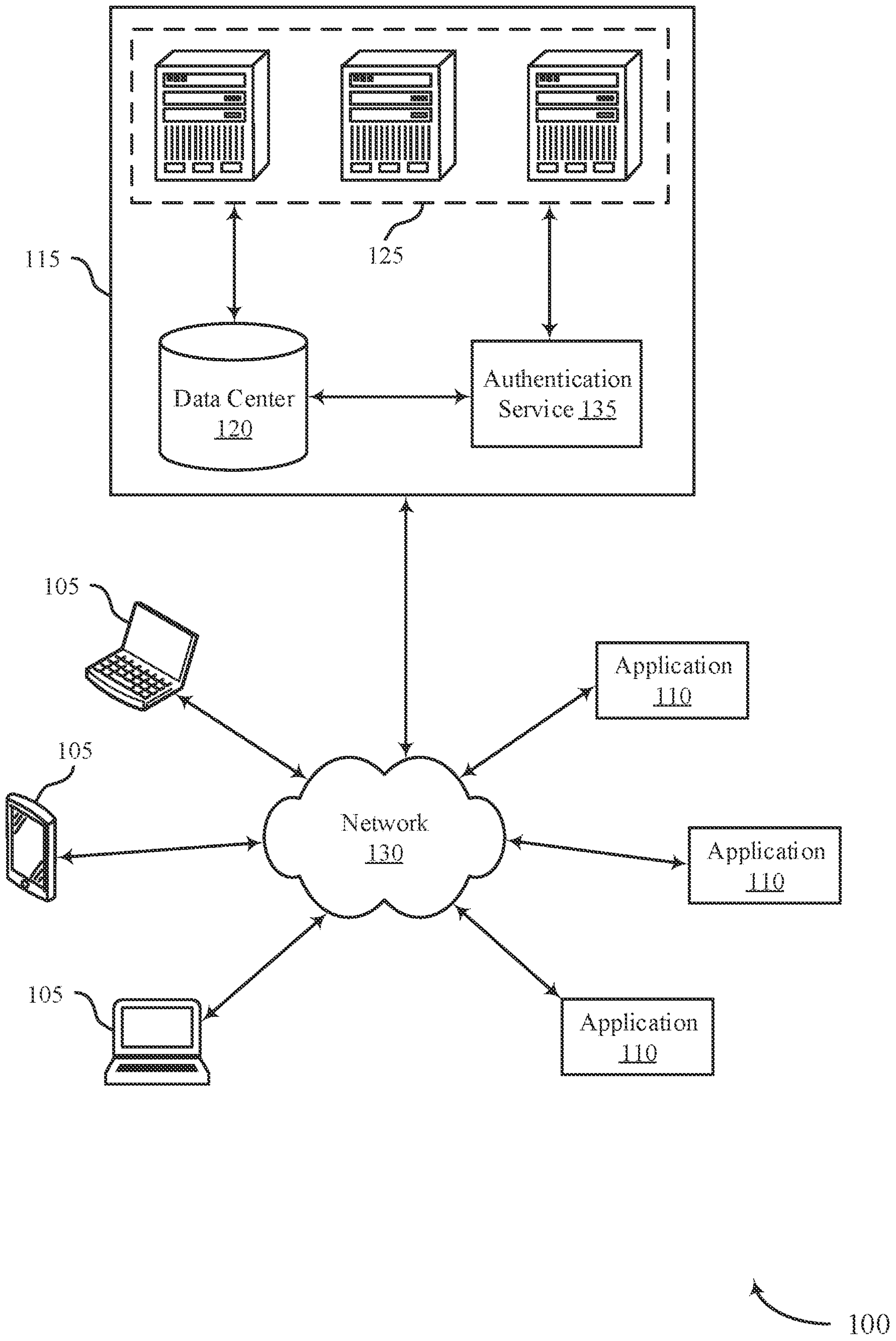
FIGS. 1 and 2 illustrate examples of systems that support using hidden fields for bot detection in accordance with aspects of the present disclosure.

An identity management platform may provide user authentication and authorization services for various applications, organizations, and devices. When a user joins an organization, their information (e.g., name, email address, username) may be entered into the identity management platform. The identity management platform may support single sign-on (SSO), enabling users to access multiple applications with a single set of credentials. Users can log in to the identity management platform with their username and password, and access all their authorized applications without having to enter their credentials again. The identity management platform may also provide various authentication methods, including username and password, multi-factor authentication (MFA), and social login. In some cases, the identity management platform may use a challenge-response security measure, such as a Completely Automated Public Turing test to tell Computers and Humans Apart (CAPTCHA), to differentiate legitimate users from unauthorized entities (such as bots or attackers).

Some unauthorized entities may attempt to disrupt the availability of a target system or network (i.e., the identity management platform) by overwhelming it with a flood of illegitimate traffic (a type of attack known as Denial of Service, or DoS for short). If left unchecked, the target system or network may be overloaded as the volume of traffic exceeds its capacity to handle requests, causing a degradation or complete loss of service for legitimate users. Additionally, or alternatively, unauthorized entities may attempt to compromise a large number of user accounts with stolen credentials (a type of attack known as Credential Stuffing). To prevent or otherwise mitigate the adverse effects of such attacks/events, the identity management platform may use an Internet Protocol (IP) address deny list to block or restrict access from specific IP addresses that are associated with malicious activities or have been identified as sources of spam, hacking attempts, or other malicious behavior. In some cases, however, it may be unclear whether login activity from a new or unknown IP address is legitimate or illegitimate. The identity management platform may employ machine learning (ML) techniques to predict whether the login activity is legitimate, but such techniques may be probabilistic, and may result in some legitimate users being restricted and/or some unauthorized entities being granted access.

Aspects of the present disclosure generally provide for using hidden login fields (also referred to as honeypot hidden fields) to detect illegitimate login activity from unauthorized entities (such as bots or attackers). For example, an identity management platform may receive information associated with a request to access one or more resources (such as a software application or website) protected by the identity management platform. The information may include an IP address and other details associated with the request. In some implementations, the request may be redirected to the identity management platform. Upon receiving the request, the identity management platform may provide (to the IP address associated with the request) data corresponding to a login page for accessing the identity management platform. The data may be configured to cause the login page to be displayed or otherwise rendered on a device associated with the IP address. The login page may include one or more login fields that are detectable (i.e., viewable) when the login page is rendered and at least one hidden field that is undetectable (i.e., unviewable) when the login page is rendered. As used herein, the term "undetectable" is in reference to the human eye or a visually assistive technology (such as a screen reader).

In turn, the identity management platform may receive (from the IP address associated with the request) a login response including one or more inputs corresponding to the fields of the login page. If, for example, the login response includes an input associated with the at least one hidden field that is undetectable when the login page is rendered, the identity management platform may determine that the request is from an unauthorized entity (such as an automated system), not a human. Accordingly, the identity management platform may add the IP address associated with the request to a list of untrusted IP addresses. Maintaining a centralized list of untrusted IP addresses may enable the identity management platform to detect and/or prevent suspicious activity across all tenants protected by the identity management platform. For example, if an IP address is flagged or blocked by the identity management platform while trying to access a domain of tenant A, the identity management platform may block or present a CAPTCHA to the same IP address if/when it tries to access a domain of tenant B, tenant C, etc. In some implementations, to prevent attackers from bypassing or circumventing the at least one hidden field, the identity management platform may randomize the location, type, and/or presence of the at least one hidden field within the login page.

Although some implementations of the described techniques are explained in the context of login pages, the hidden fields described herein can be used in various forms to perform similar detection. For example, the identity management platform may leverage hidden fields for other authentication processes, including (but not limited to) sign-up, login, verification, etc. In other words, the identity management platform may include hidden honeypot field(s) in any authentication form (such as a sign-in page, a login page, a verification page, a password reset page, or the like) with field inputs.

Particular aspects of the subject matter described in this disclosure can be implemented to realize one or more of the following potential advantages. Incorporating hidden fields into login processes may enable the identity management platform to detect unauthorized activity (i.e., bot traffic) with greater accuracy and consistency, thereby making the identity management platform less susceptible to distributed denial of service (DDoS) attacks, data breaches, credential stuffing attacks, automated login attempts, etc. Using hidden fields to distinguish legitimate traffic from illegitimate traffic may also reduce the number of unauthorized entities that are missed (i.e., not detected) by the identity management platform and/or the number of legitimate users that are mistaken for unauthorized entities, thereby resulting in greater network security and improved user experience. Keeping track of IP addresses that fill out hidden fields (for data enrichment purposes) may improve the predictive accuracy of ML models that detect/identify suspicious network activity. Randomizing the location, type, and/or presence of hidden fields may prevent sophisticated attackers from detecting or circumventing the hidden fields.

Aspects of the disclosure are initially described in the context of data processing systems, user interfaces, and process flows. Aspects of the disclosure are further illustrated by and described with reference to apparatus diagrams, system diagrams, and flowcharts that relate to using hidden fields for bot/attacker detection.

FIG. 1 illustrates an example of a system 100 that supports using hidden fields for bot detection in accordance with various aspects of the present disclosure. The system 100 includes applications 110, user devices 105, an identity management platform 115, a data center 120, and servers 125. The identity management platform 115 may communicate with user devices 105 and/or applications 110 via a network 130 (such as a public or private network). An application 110 may access the identity management platform 115 over the network 130. An application 110 generally refers to any system, application, or service that is protected by or otherwise accessible via the identity management platform 115. An application 110 may be hosted or supported by any number of virtual and/or physical machines, such as servers, databases, smartphones, laptops, desktop computers, tablets, or other computing devices/systems capable of interacting with the identity management platform 115. In some examples, an application 110 may be a business, enterprise, non-profit, startup, or website that uses the identity management platform 115 to manage user information associated with user devices 105 (i.e., customers or contacts of the client system).

The network 130 may implement (i.e., utilize) transfer control protocol and internet protocol (TCP/IP), such as the Internet, or may implement other network protocols. The network 130 represents a communication pathway between the identity management platform 115, the user devices 105, and the applications 110. In one example, the network 130 may use standard wireless and/or wired communications technologies and protocols. In another example, entities on the network 130 can use custom and/or dedicated data communication technologies.

A user device 105 may include one or more computers that enable a user to access various applications 110. A user device 105 can include, for example, a desktop computer, a laptop computer, a tablet computer, or a smartphone. A user device 105 may include one or more application modules, which enable the user device 105 to access a particular application 110. For example, an application module of a user device 105 may interact with an application 110 to log in to a user account of the application 110 (e.g., using a username/password combination). After logging in, the application module of the user device 105 can interact with the application 110 to access various services of the application 110. In some examples, the application module is a native application that executes on an operating system of the user device 105. In other examples, the application module is a plugin for a web browser of the user device 105. In some other examples, the application module is a link to a webpage associated with the application 110.

An application 110 may be, for example, a cloud-based application service, a web-based application service, a network-based application service, an on-premises application, an enterprise application, a consumer application, or a custom-built internal application. The application 110 maintains user accounts that are logged into in order to access the third-party services. The application 110 may provide an API that is usable by external systems (such as the identity management platform 115) to interact with the application 110. For example, the identity management platform 115 can use a third-party API to log in to a user account of the application 110. An application 110 may interact with one or multiple user devices 105 via the network 130. An application 110 may use the identity management platform 115 to store, manage, and process the data associated with the user devices 105. In some cases, an application 110 may have an associated security or permission level. An application 110 may have access to certain applications, data, and/or database information within the identity management platform 115 based on the associated security or permission level of the application 110, and may not have access to others.

The identity management platform 115 may support an authentication service 135 for applications 110. The identity management platform 115 may be configured to or otherwise capable of managing user accounts of various third-party services provided by applications 110. For example, the identity management platform 115 may create user accounts for various third-party services, configure the accounts with usernames and passwords, and modify, deactivate, and/or delete the accounts as needed. In some examples, the identity management platform 115 may support single sign-on (SSO) by serving as an identity provider (IdP) for one or more client systems (SPs), such as the applications 110. For example, a user can authenticate by logging into the identity management platform 115 via a user device 105. The identity management platform 115 may then provide the user device 105 with a single portal from which the user can access various third-party service user accounts without entering any additional authentication information (e.g., a username/password combination). For example, the user can interact with the portal to specify a particular third-party service, and the user device 105 can notify the identity management platform 115 accordingly.

Accordingly, the identity management platform 115 may access the appropriate authentication information (stored within the data center 120) and use it to log into the user's account for the specified third-party service of a given application 110. For example, in response to the user launching an SSO-integrated application (e.g., an application module) via the user device 105, the identity management platform 115 may automatically provide the relevant authentication information to the corresponding application 110. In one example, the identity management platform 115 may provide the relevant authentication information by inserting the information into the appropriate form fields of the application's sign-on screen(s) and executing a "sign-in" command. In another example, the identity management platform 115 may provide SSO services by interacting with an application 110 via an application programming interface (API) provided by the application 110.

In another example, the identity management platform 115 may provide SSO services by interacting with an application 110 via a configurable web script that includes information associated with accessing the application 110. In one example, the script may use machine learning techniques or explicit definitions to cause the application 110 to login a user. The machine learning techniques may be, for example, related to heuristics that are used to identify webpages which request login information (e.g., a username/password combination). In another example, a particular script is stored in association with a reference to a particular application 110. In yet another example, the script may be generated automatically.

The identity management platform 115 may provide secure user authentication and authorization for various applications 110 and user devices 105. The identity management platform 115 may simplify the management of user identities and their access to different resources within an organization. When a user joins an organization, their information (e.g., name, email address, username) is entered into the identity management platform 115. As described herein, the identity management platform 115 may support SSO, enabling users to access multiple applications 110 with a single set of credentials. Users can log in to the identity management platform 115 (e.g., via a user device 105) with their username and password, and access all their authorized applications 110 without having to enter their credentials again. The identity management platform 115 may also provide various authentication services, including username and password, multi-factor authentication (MFA), and social login. MFA adds an extra layer of security by prompting users to provide additional verification, such as a code from a mobile app or biometric factors, such as a fingerprint scan or facial recognition. The identity management platform 115 may act as a central user directory, storing user profiles and their attributes in a data center 120. The identity management platform 115 can integrate with existing directories using Active Directory (AD) or Lightweight Directory Access Protocol (LDAP), ensuring a centralized source of user information.

The identity management platform 115 may be configured to or otherwise capable of integrating with a wide range of applications 110, both cloud-based and on-premises. The identity management platform 115 may support various protocols like Security Assertion Markup Language (SAML) and OpenID Connect (OIDC), enabling secure communication between the identity management platform and the associated software applications 110. The identity management platform 115 may enable administrators to define policies and rules to control user access to resources. Administrators can set permissions based on factors like user roles, groups, and attributes. The identity management platform 115 can automate user lifecycle management tasks such as provisioning, deprovisioning, and user updates. When a user joins or leaves an organization, their access to applications 110 and resources can be automatically granted or revoked, reducing administrative overhead. Additionally, or alternatively, the identity management platform 115 may provide security features to protect user identities and data. For example, the identity management platform 115 may support cryptographic techniques, threat detection, and monitoring capabilities to ensure the integrity and confidentiality of user information. The identity management platform 115 may also help organizations comply with various regulatory requirements.

The identity management platform 115 may support an authentication service 135 for applications 110. The authentication service 135 may be individually or collectively provided by one or more virtual/physical machines, servers 125, databases, smartphones, laptops, desktop computers, tablets, or computing devices associated with the identity management platform 115. The authentication service 135 may communicate with user devices 105 and/or applications 110 via the network 130. The authentication service 135 may authorize a user device 105 to access applications 110 based on verifying a login, sign-up, authentication, and/or password reset request from the user device 105.

In some cases, the identity management platform 115 may be implemented as a multi-tenant system. For instance, the identity management platform 115 may serve multiple applications 110 (i.e., tenants) with a single instance of software. However, other types of systems may be implemented, including—but not limited to—client-server systems, mobile device systems, and mobile network systems. In some implementations, the identity management platform 115 may support identity management solutions. The identity management platform 115 may receive data associated with user devices 105 from applications 110 over the network 130, and may store/analyze the data. In some cases, the identity management platform 115 may receive data directly from a user device 105 and/or an application 110. In some cases, users may develop applications 110 to run on resources associated with the identity management platform 115. The identity management platform 115 may, in some implementations, include servers 125. In some cases, the servers 125 may be integrated with or otherwise connected to the data center 120.

The data center 120 may include one or multiple servers 125. The servers 125 may be used for data storage, management, and/or processing. The data center 120 may communicate with other components of the identity management platform 115 via a network connection, or directly from an application 110 and/or user device 105. The data center 120 may leverage redundancy for security purposes. In some cases, data stored at the data center 120 may be backed up by copies of the data at another data center 120. In some cases, data processing may occur at any of the components of the identity management platform 115, or at a combination of these components. In some cases, servers 125 may perform the data processing. The servers 125 may be associated with an application 110 or located at the data center 120.

The identity management platform 115 may be an example of a multi-tenant system. For example, the identity management platform 115 may store data and provide services, solutions, or any other functionality for multiple tenants concurrently. A tenant may refer to an application 110 or a group of users (e.g., an organization) who share access, privileges, or both. The identity management platform 115 may effectively separate data and processes for a first tenant from data and processes for other tenants using a system architecture, logic, or both that support secure multi-tenancy. In some examples, the identity management platform 115 may include or be an example of a multi-tenant database system that stores data for different tenants (such as applications 110) in a single database or a single set of databases. To support multi-tenant security, the multi-tenant database system may prohibit (e.g., restrict) a first tenant from accessing, viewing, or interacting in any way with data associated with a different tenant. As such, data of the first tenant may be isolated (e.g., logically isolated) from data of a second tenant, and the tenant data for the first tenant may be inaccessible to the second tenant. The identity management platform 115 may additionally use encryption techniques to further protect tenant-specific data from unauthorized access (e.g., by another tenant).

The identity management platform 115 may support any configuration for providing multi-tenant functionality. For example, the identity management platform 115 may organize resources (e.g., processing resources, memory resources) to support tenant isolation (e.g., tenant-specific resources), tenant isolation within a shared resource (e.g., within a single instance of a resource), tenant-specific resources in a resource group, tenant-specific resource groups corresponding to a same subscription, tenant-specific subscriptions, or any combination thereof. The identity management platform 115 may support scaling of tenants within the multi-tenant system, for example, using scale triggers, automatic scaling procedures, scaling requests, or any combination thereof. In some cases, the identity management platform 115 may implement one or more scaling rules to promote sharing of resources across tenants. For example, a tenant may have a threshold quantity of processing resources, memory resources, or both.

In accordance with the techniques described herein, the authentication service 135 of the identity management platform 115 may receive information associated with a request to access one or more resources that are protected by the identity management platform (such as resources associated with an application 110). The information may include at least an IP address associated with the request. The authentication service 135 may transmit, to a user device 105 associated with the IP address, data corresponding to a login page associated with accessing the one or more resources. The data may include one or more login fields that are detectable when the login page is rendered and at least one hidden field that is undetectable when the login page is rendered. The authentication service 135 may receive, from the user device 105 associated with the IP address, a login response comprising a first set of one or more inputs corresponding to the one or more login fields that are detectable when the login page is rendered and a second set of one or more inputs corresponding to the at least one hidden field that is undetectable when the login page is rendered. The authentication service 135 may determine that the IP address corresponds to an untrusted/unauthorized entity (such as a bot, attacker, or anyone other than the user owning the login credentials) based on the login response including the second set of one or more inputs for the at least one hidden field in the login page.

It should be appreciated by a person skilled in the art that one or more aspects of the disclosure may be implemented to solve problems other than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
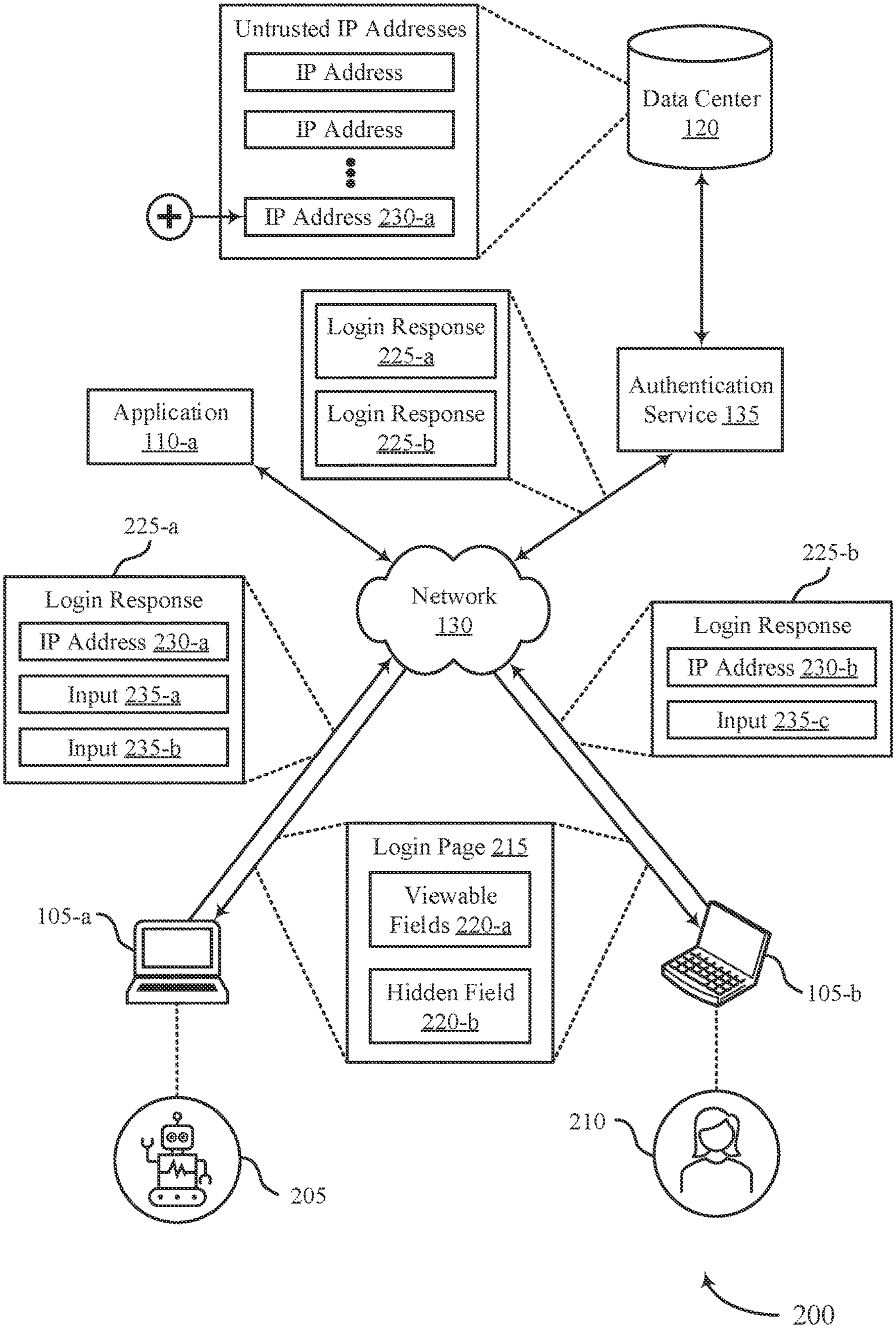

FIG. 2 shows an example of a system 200 that supports using hidden fields for bot detection in accordance with aspects of the present disclosure. The system 200 may implement one or more aspects of the system 100. For example, the system 200 includes a network 130, a user device 105-*a*, a user device 105-*b*, an application 110-*a*, an authentication service 135, and a data center 120, which may be examples of corresponding elements shown and described with reference to FIG. 1. The authentication service 135 and/or the data center 120 may be a part of the identity management platform 115 shown and described with reference to FIG. 1. In the example of FIG. 2, the authentication service 135 may determine that an IP address 230-*a* of the user device 105-*a* corresponds to an unauthorized entity 205 (such as a bot or attacker) based on the contents of a login response 225-*a* from the user device 105-*a*.

As described herein, the identity management platform 115 may provide user authentication and authorization services for various applications 110, organizations, and user devices 105. When a user 210 joins an organization, their information (e.g., name, email address, username) may be entered into the identity management platform 115. The identity management platform 115 may support SSO, enabling the user 210 to access multiple applications 110 with a single set of credentials. The user 210 can log in to the identity management platform 115 with their username and password, and access all their authorized applications 110 without having to enter their credentials again. The identity management platform 115 may also provide various authentication services, including username and password, multi-factor authentication (MFA), and social login. In some cases, the identity management platform 115 may use a challenge-response security measure, such as a CAPTCHA, to differentiate the user 210 (i.e., a legitimate user) from an unauthorized entity 205 (such as a bot or attacker).

The unauthorized entity 205 may attempt to disrupt the availability of the identity management platform 115 and/or the application 110-*a* by overwhelming the system 200 with a flood of illegitimate traffic. If left unchecked, the system 200 may be overloaded as the volume of traffic exceeds its capacity to handle requests, causing a degradation or complete loss of service for legitimate users (such as the user 210). To prevent or otherwise mitigate the adverse effects of such events, the identity management platform 115 may use an IP address deny list to block or restrict access from specific IP addresses that are associated with malicious activities or have been identified as sources of spam, hacking attempts, or other malicious behavior. In some cases, however, it may be unclear whether login activity from a new or unknown IP address is legitimate or illegitimate. The identity management platform 115 may employ ML techniques to predict whether login activity is legitimate, but such techniques may be probabilistic, and may result in some legitimate users (such as the user 210) being restricted and/or some unauthorized users (such as the unauthorized entity 205) being granted access.

The techniques described herein generally provide for using hidden field 220-*b* (also referred to as honeypot fields) to detect illegitimate login activity from unauthorized entities. For example, the identity management platform 115 may receive information associated with a request to access one or more resources (such as the application 110-*a*) protected by the identity management platform 115. The information may include an IP address 230-*a* and other details associated with the request. In some implementations, the request may be redirected from the application 110-*a* to the identity management platform 115. Upon receiving the request, the identity management platform 115 may provide (to the IP address 230-*a* associated with the request) data corresponding to a login page 215 for accessing the identity management platform 115. The data may be configured to cause the login page 215 to be displayed or otherwise rendered on the user device 105-*a* associated with the IP address 230-*a*. The login page 215 may include one or more login fields 220-*a* that are detectable when the login page 215 is rendered and at least one hidden field 220-*b* that is undetectable when the login page 215 is rendered.

In turn, the identity management platform 115 may receive (from the IP address 230-*a* associated with the request) a login response 225-*a* including one or more inputs corresponding to the fields of the login page. If, for example, the login response 225-*a* includes an input 235-*a* associated with the one or more login fields 220-*a* (which are detectable when the login page 215 is rendered) and an input 235-*b* associated with the at least one hidden field 220-*b* (which is undetectable when the login page 215 is rendered), the identity management platform 115 may determine that the request is from an unauthorized entity 205. In contrast, a login response 225-*b* from a user device 105-*b* associated with a legitimate user 210 may include an input 235-*c* for the one or more login fields 220-*a*, and may exclude or omit an input for the hidden field 220-*b*. In such examples, the identity management platform 115 may determine that the IP address 230-*b* associated with the login response 225-*b* is valid.

Accordingly, the identity management platform 115 may add the IP address 230-*a* associated with the illegitimate request to a list of untrusted IP addresses maintained by the identity management platform 115. Maintaining a centralized list of untrusted IP addresses may enable the identity management platform 115 to detect and/or prevent suspicious activity across all tenants protected by the identity management platform 115. For example, if the IP address 230-*a* is flagged or blocked by the identity management platform 115 while trying to access a domain of tenant A, the identity management platform 115 may block or present a CAPTCHA to the same IP address 230-*a* if/when it tries to access a domain of tenant B, tenant C, etc. In some implementations, to prevent attackers from bypassing or circumventing the at least one hidden field 220-*b*, the identity management platform 115 may randomize the location, type, and/or presence of the at least one hidden field 220-*b* within the login page 215 (as shown and described with reference to FIGS. 3A and 3B).

One or more innovative aspects of the system 200 can be implemented to realize the following potential advantages. Incorporating hidden field 220-*b* into login processes may enable the identity management platform 115 to detect malicious activity (i.e., bot traffic) with greater accuracy and consistency, thereby making the identity management platform 115 less susceptible to DDOS attacks, data breaches, credential stuffing attacks, automated login attempts, etc. Using hidden field 220-*b* to distinguish legitimate traffic from illegitimate traffic may also reduce the number of unauthorized entities that are missed (i.e., not detected) by the identity management platform 115 and/or the number of legitimate users that are mistaken for unauthorized entities, thereby resulting in greater network security and improved user experience. Keeping track of IP addresses that fill out hidden field 220-*b* (for data enrichment purposes) may improve the predictive accuracy of ML models that detect/identify suspicious network activity. Randomizing the location, type, and/or presence of hidden field 220-*b* may prevent sophisticated attackers from guessing or circumventing the hidden field 220-*b*.

Figure 3A:
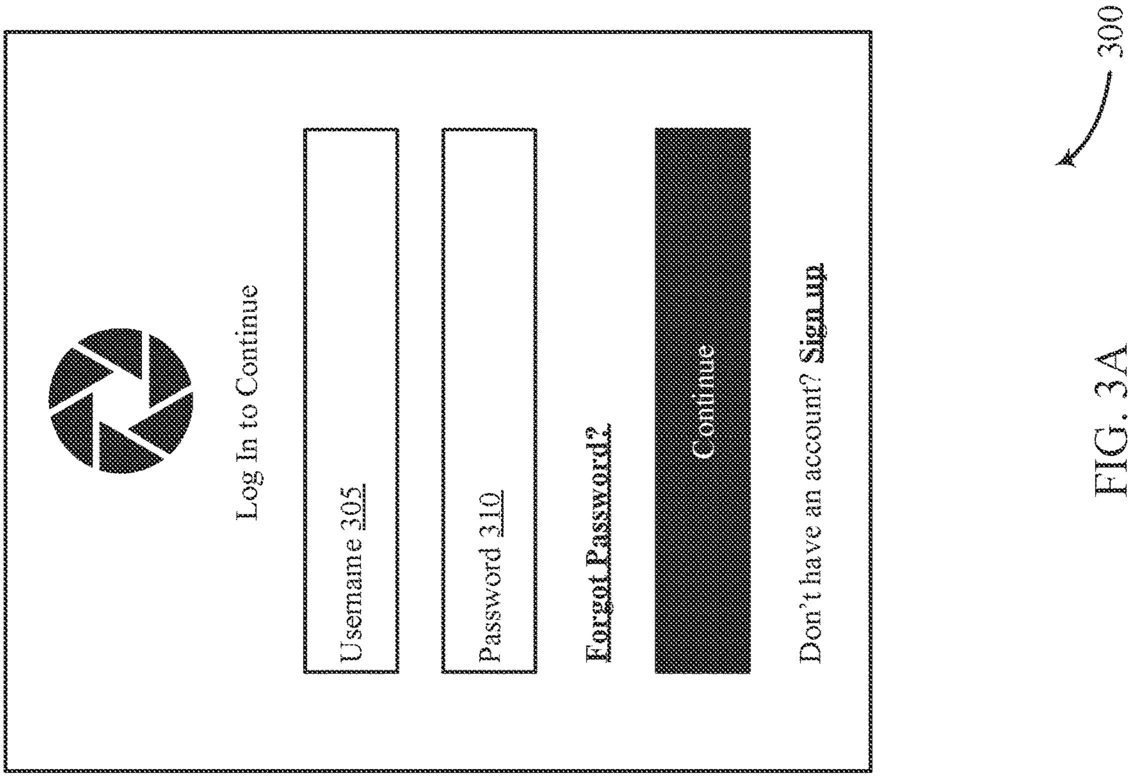
FIGS. 3A and 3B show examples of a login page that support using hidden fields for bot detection in accordance with aspects of the present disclosure.
Figure 3B:
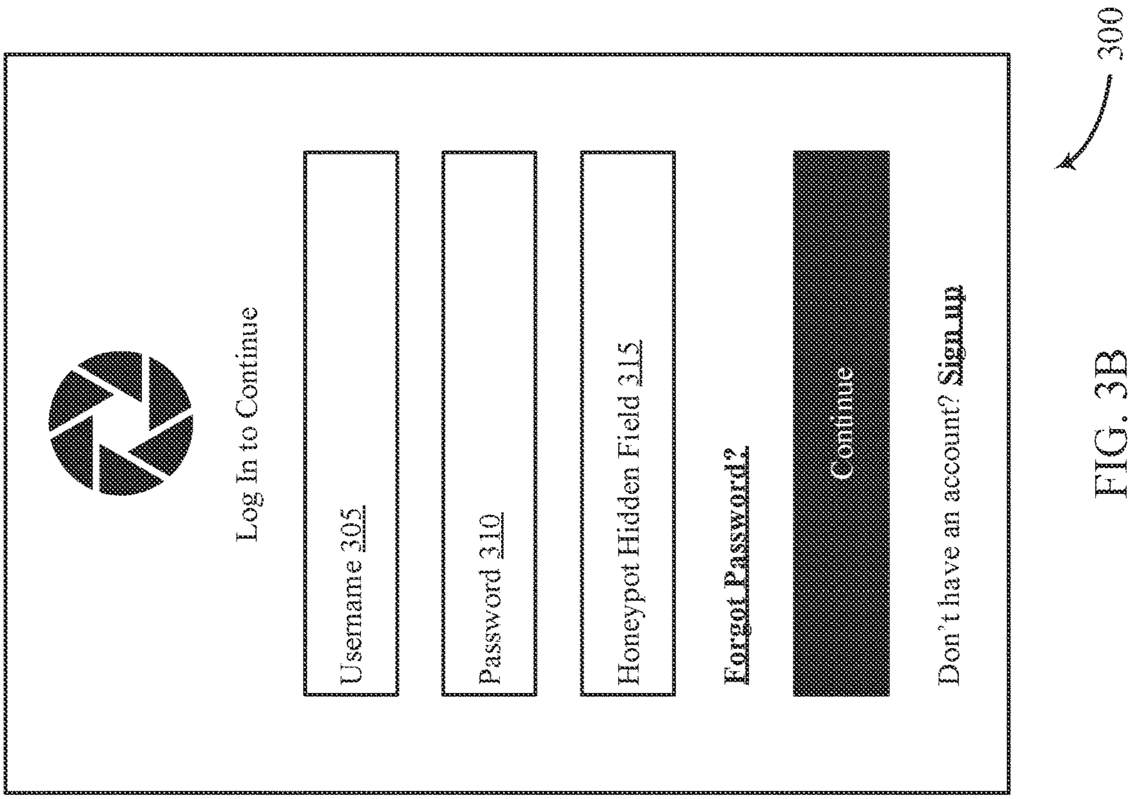

FIGS. 3A and 3B show examples of a login page 300 that support using hidden fields for bot detection in accordance with aspects of the present disclosure. The login page 300 may implement one or more aspects of the system 100 or the system 200. For example, the login page 300 may be examples of the login page 215, as shown and described with reference to FIG. 2. The login page 300 may be displayed or otherwise rendered on a user device 105, as shown and described with reference to FIGS. 1 and 2. FIG. 3A illustrates an example of what a legitimate user 210 would perceive when the login page 300 is rendered, whereas FIG. 3B illustrates an example of what an unauthorized entity 205 (such as a bot or attacker) would perceive when the login page 300 is rendered.

As described herein, including with reference to FIGS. 1 and 2, a bad actor (i.e., malicious user) may use a scripted attack, such as a DOS attack (where a single bot or source attacks a victim host) or a DDOS attack (where several bots or sources attack the victim host), to potentially overwhelm a login, sign-up, verification, and/or password reset form of a customer or tenant of the identity management platform 115. A scripted attack may involve using automated scripts or tools to overwhelm the tenant's system or server(s) with a high volume of fraudulent login requests. In some implementations, an attacker may intentionally try not to overwhelm the tenant/host system in an effort to avoid reaching a volume of requests that would be suspicious or trigger other protection mechanisms of the tenant. In other implementations, an attacker may use a scripted attack to exhaust the tenant's resources and cause service disruptions. In some other implementations, an attacker may perform a high volume of login attempts using leaked or stolen credentials to try to gain access to the tenant system. In some types of attacks, an attacker may assemble a botnet, which is a network of compromised computers or devices under the control of the attacker. These compromised machines, often referred to as "bots" or "zombies," can be infected with malware or controlled through other means, such as by exploiting security vulnerabilities.

Accordingly, the attacker may develop a script or a set of scripts specifically designed to automate the sign-up, login, verification, and/or password reset process. These scripts can be written in various programming or scripting languages, and are often customized based on the target system (i.e., a tenant of the identity management platform 115). The attacker selects a specific target (such as a website, service, or system with a login mechanism), and deploys the botnet to send requests to the target login page or authentication system. The login requests can be generated with random or preconfigured usernames and passwords. In some implementations, the objective of the attacker is to flood the target login infrastructure with an overwhelming amount of traffic, causing it to become slow or unresponsive. As the system tries to process the flood of incoming login requests, its computational resources (such as CPU, memory, and network bandwidth) are consumed, leading to a degradation of performance and, in extreme cases, a complete denial of service.

In other implementations, attackers may use bots to send login requests at a volume that remains below a threshold (such as a rate limit or volumetric attack detection threshold) of the identity management platform 115, with the goal of gaining access to compromised user accounts. For example, the attacker may attempt to log into a user account with a stolen credential. The objective of this type of attack (referred to as a Credential Stuffing attack) is to compromise a large number of user accounts with stolen credentials by testing them against the login platform (e.g., a website, service, or system with a login mechanism).

To mitigate such attacks, the identity management platform 115 may employ various defensive measures. These can include rate limiting, which restricts the number of login requests from a single IP address or within a specific time frame. CAPTCHA challenges, IP blocking, behavioral analysis, and/or anomaly detection systems can also be used to help identify and block malicious login attempts. Additionally, or alternatively, the identity management platform 115 may use ML or artificial intelligence (AI) to predict whether a given IP address or login request is legitimate or not. For example, the identity management platform 115 may predict the likelihood that a given IP address is a "bot" based on traffic patterns, previous login attempts, etc. However, such mechanisms are predictive, and may result in false negatives (i.e., bots being misclassified as legitimate users) and false positives (i.e., legitimate users being labeled as bots).

In accordance with the techniques described herein, the identity management platform 115 may use hidden fields 315 (also referred to as honeypot fields) to differentiate legitimate users from bots and other fraudulent entities. These hidden fields 315 may be undetectable (i.e., unviewable) to humans when displayed or presented. For example, when the login page 300 is rendered, a legitimate user may be able to view or otherwise perceive a username field 305 and a password field 310. The username field 305 may refer to an email address, phone number, an account identifier, or some other form of user identification. The login page 300 may also include an option to reset a forgotten password, an option to sign-up or register a new account, etc. Any hidden fields 315 in the login page 300 may be obscured or rendered undetectable to the user. In contrast, a scripted or unauthorized bot may perceive the username field 305, the password field 310, and the hidden field 315 (as shown in the example of FIG. 3B).

The hidden fields 315 may be obscured using a variety of techniques. For example, the hidden fields 315 may have one or more Cascading Style Sheets (CSS) properties which cause the hidden fields 315 to remain hidden (i.e., unviewable) when the login page 300 is rendered. Alternatively, the hidden fields 315 may be configured such that they are positioned outside the visible "frame" of the device viewing the login page 300. Other methods of obfuscating the hidden fields 315 are contemplated within the scope of the present disclosure. The hidden fields 315 may be configured such that they are not rendered, dictated, or otherwise presented to users with accessibility issues or screen reading tools. The hidden fields 315 may also be configured such that password managers and other browser extensions do not automatically populate the hidden fields 315. In some implementations, the presence, frequency, and/or type of the hidden fields 315 may be randomized to prevent attackers from circumventing the hidden fields 315. For example, the hidden fields 315 may be presented to a first device as a text field, to a second device as a CAPTCHA, etc. Likewise, the hidden fields 315 may be positioned above the username field 305 for one device, in between the username field 305 and the password field 310 for another device, etc. The hidden fields 315 may also be present in some cases and absent in others.

If an input is received for the hidden fields 315, the identity management platform 115 may infer that the request is from an illegitimate entity, and may take measures to block or restrict the IP address associated with the request. The identity management platform 115 may also use honeypot IP addresses (e.g., IP addresses that provide an input for the hidden fields 315) to enrich a centralized list of untrusted IP addresses maintained by the identity management platform 115. The list of untrusted IP addresses may include a combination of first-party data (such as honeypot IP addresses detected by the identity management platform 115) and third-party data (such as known malicious IP addresses identified by an external source). The identity management platform 115 may use the centralized list of untrusted IP addresses to identify/prevent malicious network activity across all tenants of the identity management platform 115. For example, if the identity management platform 115 detects a suspicious IP address trying to access a domain of tenant A, the identity management platform 115 may block or present a CAPTCHA to the suspicious IP address if/when it tries to access a domain of tenant B, tenant C, etc.

The honeypot detection schemes described herein can be used in combination with other ML/AI prediction schemes to improve the accuracy of bot detection at the identity management platform 115. For example, the identity management platform 115 may use honeypot detection and AI/ML prediction in parallel to protect digital assets from DDOS attacks, account takeovers, and other bot-related threats with greater speed, resiliency, and accuracy. In some implementations, the identity management platform 115 may give tenants the option to enable or disable hidden fields 315, enable tenant logs for risk assessment, create a tenant-specific list of untrusted IP addresses, or control other aspects of the tenant login workflow, thereby providing tenants with greater flexibility.

Figure 4:
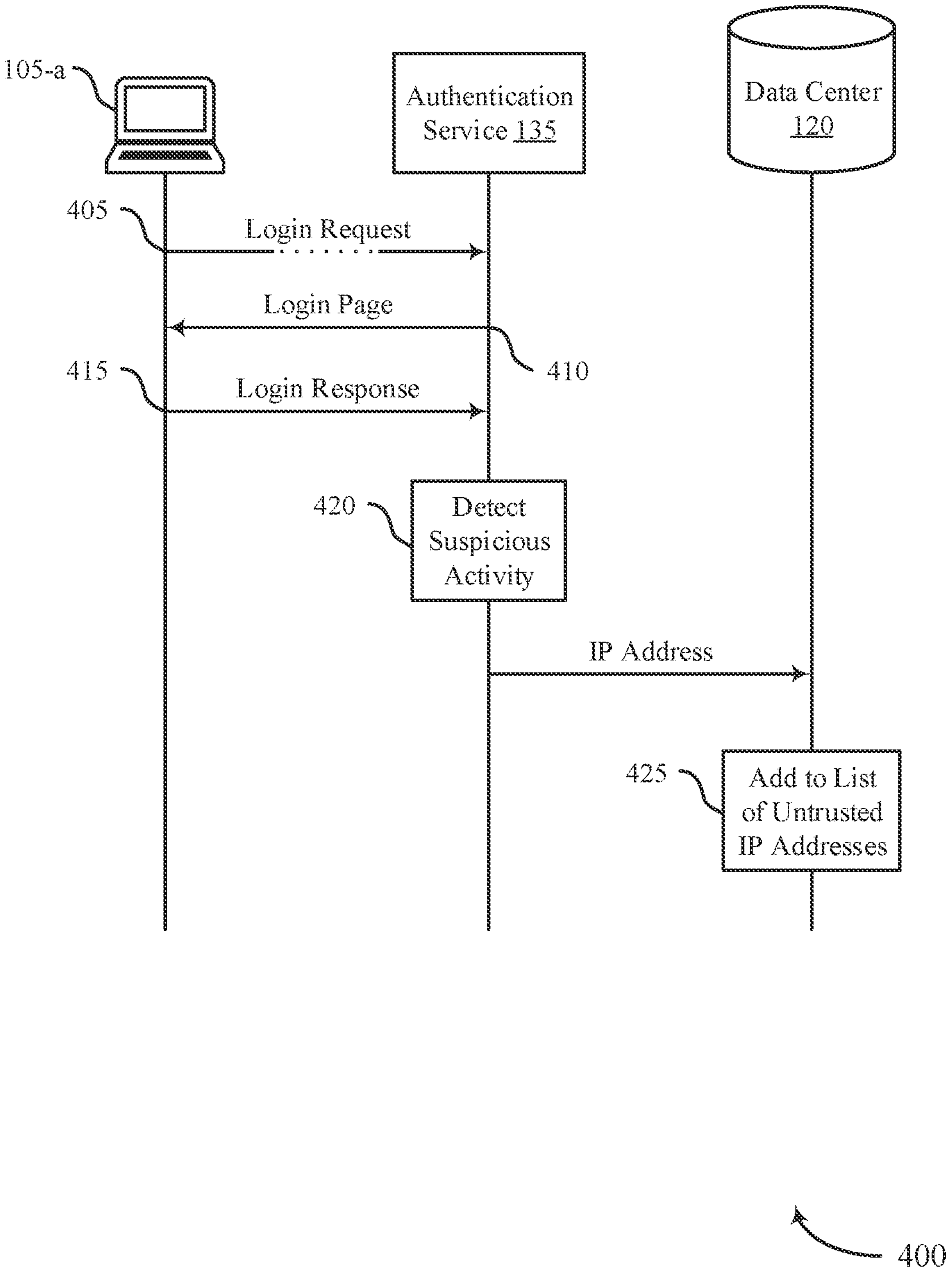
FIG. 4 shows an example of a process flow that supports using hidden fields for bot detection in accordance with aspects of the present disclosure.

FIG. 4 shows an example of a process flow 400 that supports using hidden fields for bot detection in accordance with aspects of the present disclosure. The process flow 400 may implement one or more aspects of the system 100, the system 200, or the login page 300. For example, the process flow 400 includes a user device 105-*a*, an authentication service 135, and a data center 120, which may be examples of corresponding elements shown and described with reference to FIGS. 1-3. The authentication service 135 and the data center 120 may be a part of the identity management platform 115, as shown and described with reference to FIG. 1. In the following description of the process flow 400, operations between the user device 105-*a*, the authentication service 135, and the data center 120 may be added, omitted, or performed in a different order (with respect to the exemplary order shown).

At 405, the authentication service 135 may receive information associated with a request to access one or more resources that are protected by the identity management platform 115. The information may include an IP address 230-*a* of the user device 105-*a* that initiated the request. In some examples, the request may be routed or redirected from a tenant of the identity management platform 115 (such as the application 110-*a*) to the authentication service 135.

At 410, the authentication service 135 may transmit, to the IP address 230-*a* associated with the request, data corresponding to a login page 215 associated with the one or more protected resources. The data may include one or more login fields 220-*a* that are detectable when the login page 215 is rendered and at least one hidden field 220-*b* that is undetectable when the login page 215 is rendered. In some implementations, the at least one hidden field 220-*b* may include a CAPTCHA or a text field that is undetectable when the login page 215 is rendered. In some examples, the at least one hidden field 220-*b* may be configured with one or more properties which cause the at least one hidden field 220-*b* to be undetectable when the login page 215 is rendered. In other examples, the at least one hidden field 220-*b* may be rendered outside a viewable frame of the login page 215. In some implementations, the presence, location, or type of the at least one hidden field 220-*b* may be randomized for each login attempt.

At 415, the authentication service 135 may receive a login response 225-*a* from the user device 105-*a* associated with the IP address 230-*a*. The login response 225-*a* may include an input 235-*a* for the one or more login fields 220-*a* that are detectable when the login page 215 is rendered, and an input 235-*a* for the at least one hidden field 220-*b* that is undetectable when the login page 215 is rendered.

At 420, the authentication service 135 may determine that the IP address 230-*a* associated with the request corresponds to an unauthorized entity 205 based on the login response 225-*a* including the input 235-*b* for the at least one hidden field 220-*b* in the login page 215. In some implementations, to determine whether the IP address 230-*a* corresponds to a legitimate user 210 or an unauthorized entity 205, the authentication service 135 may use a trained ML model to predict (based on historical data, traffic patterns, and/or the contents of the login response 225-*a*) the likelihood that the IP address 230-*a* corresponds to an unauthorized entity. If the likelihood is sufficiently high (i.e., above a threshold), the authentication service 135 may block the IP address 230-*a* or present a CAPTCHA to the user device 105-*a*.

At 425, the authentication service 135 may use the IP address 230-*a* of the user device 105-*a* to enrich a list of untrusted IP addresses maintained by the identity management platform 115. The list of untrusted IP addresses may include a combination of first-party data and third-party data. Once added, the IP address 230-*a* may be flagged if the user device 105-*a* attempts to login to another domain protected by the identity management platform 115. For example, if the user device 105-*a* later attempts to access an application 110-*a* protected by the identity management platform 115 and the IP address 230-*a* of the user device 105-*a* is on the list of untrusted IP addresses, the authentication service 135 may present a CAPTCHA to deter scripted bots and attackers from completing the login process.

Figure 5:
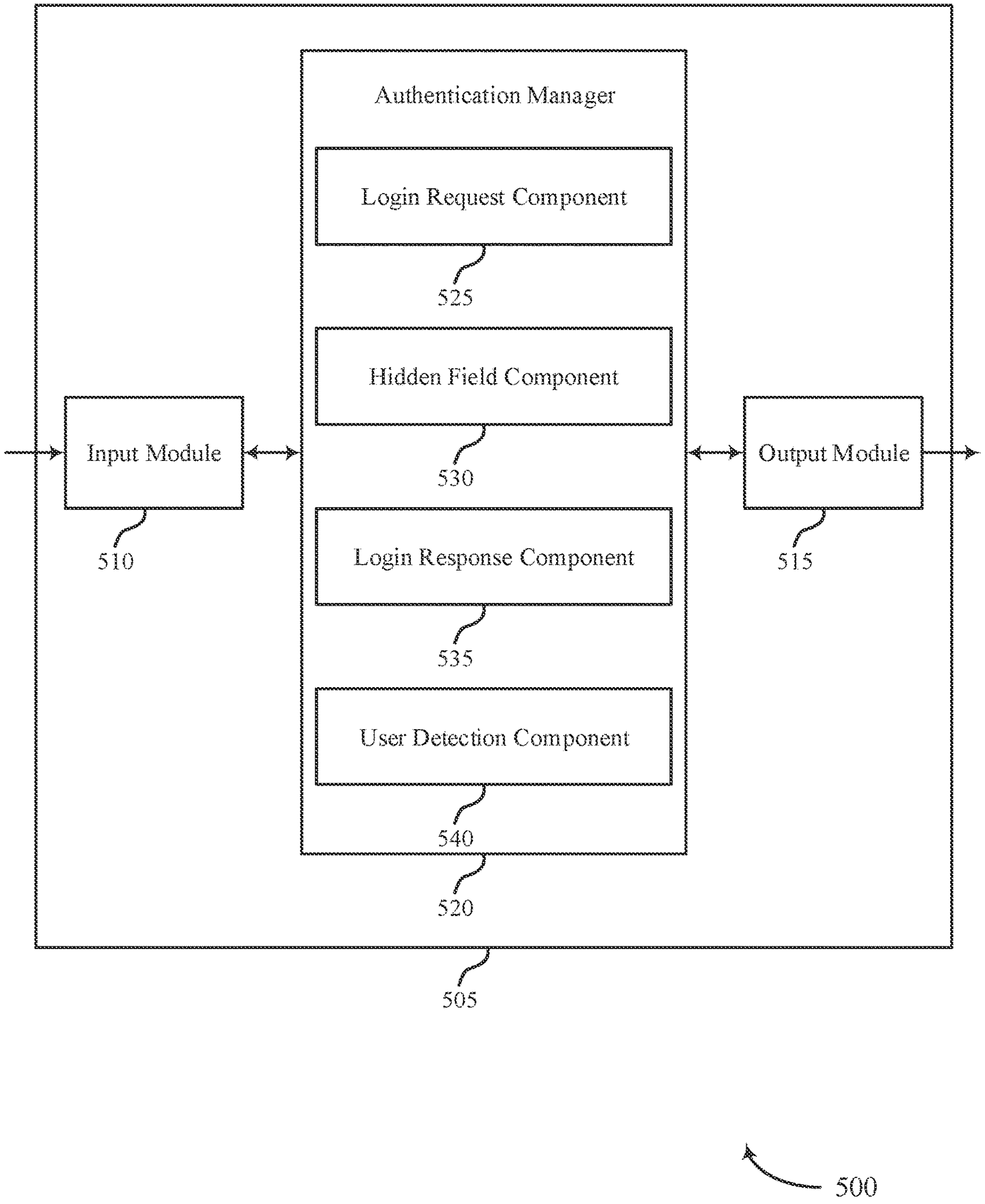
FIG. 5 shows a block diagram of an apparatus that supports using hidden fields for bot detection in accordance with aspects of the present disclosure.

FIG. 5 shows a block diagram 500 of a device 505 that supports using hidden fields for bot detection in accordance with aspects of the present disclosure. The device 505 may include an input module 510, an output module 515, and an authentication manager 520. The device 505, or one of more components of the device 505 (e.g., the input module 510, the output module 515, and the authentication manager 520), may include at least one processor, which may be coupled with at least one memory, to support the described techniques. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the authentication manager 520 to support using hidden fields for bot detection. In some cases, the input module 510 may be a component of an input/output (I/O) controller 710 as described with reference to FIG. 7.

The output module 515 may manage output signals for the device 505. For example, the output module 515 may receive signals from other components of the device 505, such as the authentication manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the authentication manager 520 may include a login request component 525, a hidden field component 530, a login response component 535, a user detection component 540, or any combination thereof. In some examples, the authentication manager 520, or various components thereof, may be configured to perform various operations (e.g., receiving, monitoring, transmitting) using or otherwise in cooperation with the input module 510, the output module 515, or both. For example, the authentication manager 520 may receive information from the input module 510, send information to the output module 515, or be integrated in combination with the input module 510, the output module 515, or both to receive information, transmit information, or perform various other operations as described herein.

The login request component 525 may be configured to or otherwise capable of receiving information associated with a request to access one or more resources that are protected by an identity management platform, the information including at least an IP address associated with the request. The hidden field component 530 may be configured to or otherwise capable of transmitting, to the IP address associated with the request, data corresponding to a login page associated with accessing the one or more resources, the data including one or more login fields that are detectable when the login page is rendered and at least one hidden field that is undetectable when the login page is rendered. The login response component 535 may be configured to or otherwise capable of receiving, from the IP address associated with the request, a login response including a first set of one or more inputs corresponding to the one or more login fields that are detectable when the login page is rendered and a second set of one or more inputs corresponding to the at least one hidden field that is undetectable when the login page is rendered. The user detection component 540 may be configured to or otherwise capable of determining that the IP address associated with the request corresponds to an unauthorized entity based on the login response including the second set of one or more inputs for the at least one hidden field in the login page.

Figure 6:
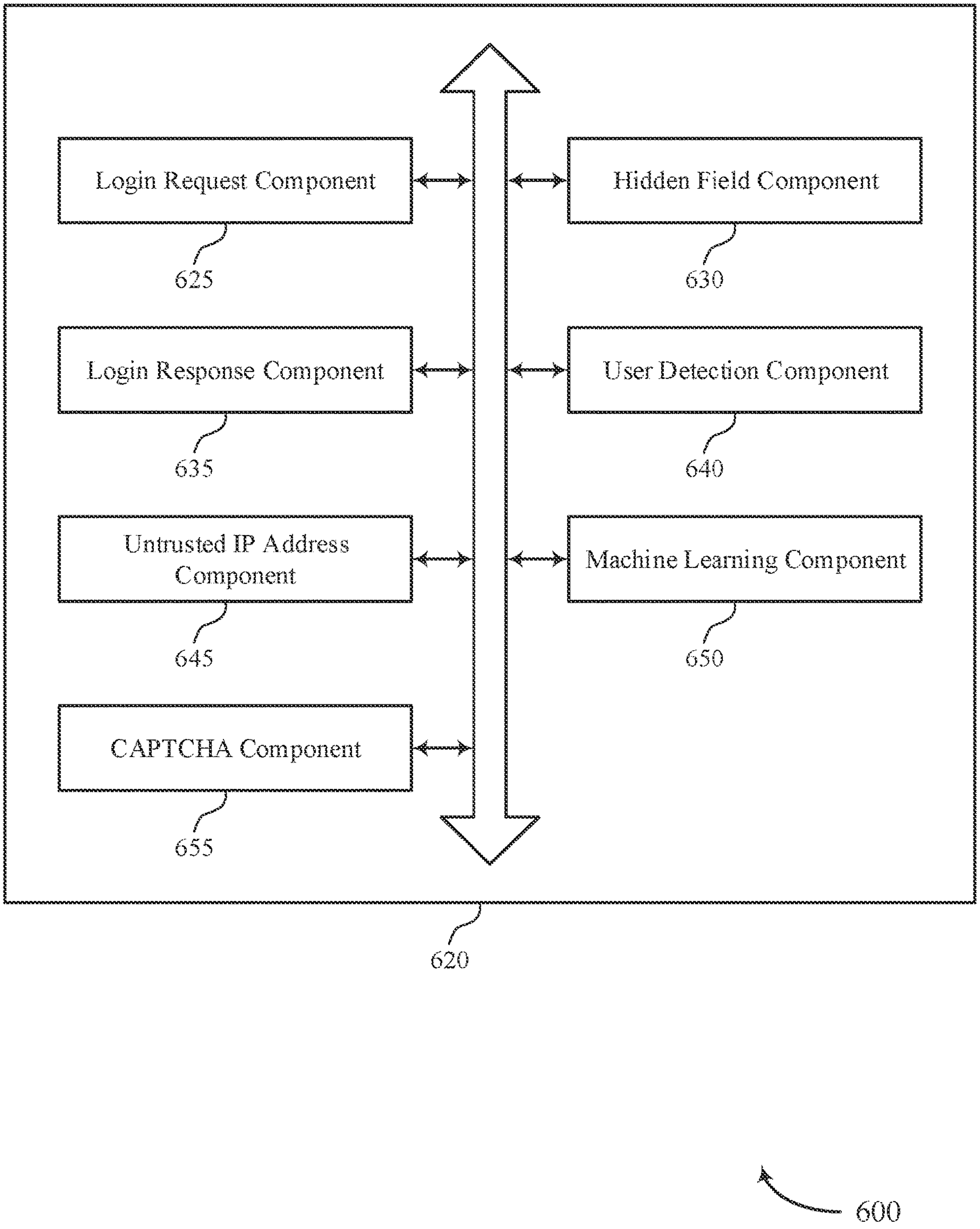
FIG. 6 shows a block diagram of an authentication manager that supports using hidden fields for bot detection in accordance with aspects of the present disclosure.

FIG. 6 shows a block diagram 600 of an authentication manager 620 that supports using hidden fields for bot detection in accordance with aspects of the present disclosure. The authentication manager 620 may be an example of aspects of an authentication manager or an authentication manager 520, or both, as described herein. The authentication manager 620, or various components thereof, may be an example of means for performing various aspects of using hidden fields for bot detection as described herein. For example, the authentication manager 620 may include a login request component 625, a hidden field component 630, a login response component 635, a user detection component 640, an untrusted IP address component 645, a machine learning component 650, a CAPTCHA component 655, or any combination thereof. Each of these components, or components of subcomponents thereof (e.g., one or more processors, one or more memories), may communicate, directly or indirectly, with one another (e.g., via one or more buses).

The login request component 625 may be configured to or otherwise capable of receiving information associated with a request to access one or more resources that are protected by an identity management platform, the information including at least an IP address associated with the request. The hidden field component 630 may be configured to or otherwise capable of transmitting, to the IP address associated with the request, data corresponding to a login page associated with accessing the one or more resources, the data including one or more login fields that are detectable when the login page is rendered and at least one hidden field that is undetectable when the login page is rendered. The login response component 635 may be configured to or otherwise capable of receiving, from the IP address associated with the request, a login response including a first set of one or more inputs corresponding to the one or more login fields that are detectable when the login page is rendered and a second set of one or more inputs corresponding to the at least one hidden field that is undetectable when the login page is rendered. The user detection component 640 may be configured to or otherwise capable of determining that the IP address associated with the request corresponds to an unauthorized entity based on the login response including the second set of one or more inputs for the at least one hidden field in the login page.

In some examples, the at least one hidden field includes a CAPTCHA or a text field that is undetectable when the login page is rendered. In some examples, the at least one hidden field is configured with one or more properties that cause the at least one hidden field to be undetectable when the login page is rendered. In some examples, the at least one hidden field is rendered outside a viewable frame of the login page.

In some examples, the untrusted IP address component 645 may be configured to or otherwise capable of adding the IP address of the unauthorized entity to a set of untrusted IP addresses associated with the identity management platform. In some examples, the set of untrusted IP addresses maintained by the identity management platform includes one or more untrusted IP addresses provided by an external data source.

In some examples, to support determining that the IP address corresponds to the unauthorized entity, the machine learning component 650 may be configured to or otherwise capable of using a machine learning model to predict whether the IP address associated with the request corresponds to an unauthorized entity.

In some examples, to support determining that the IP address corresponds to the unauthorized entity, the CAPTCHA component 655 may be configured to or otherwise capable of transmitting a CAPTCHA to the IP address based on a prediction that the IP address associated with the request corresponds to an unauthorized entity.

In some examples, a presence, location, or type of the at least one hidden field is randomized for each login request. In some examples, the at least one hidden field is undetectable to users with accessibility impairments or reading modifications.

In some examples, the login request component 625 may be configured to or otherwise capable of receiving, from a second IP address associated with a second request to access the one or more resources associated with the identity management platform, a second login response without an input for the at least one hidden field. In some examples, the user detection component 640 may be configured to or otherwise capable of determining that the second IP address is valid based on the second login response excluding an input for the at least one hidden field.

Figure 7:
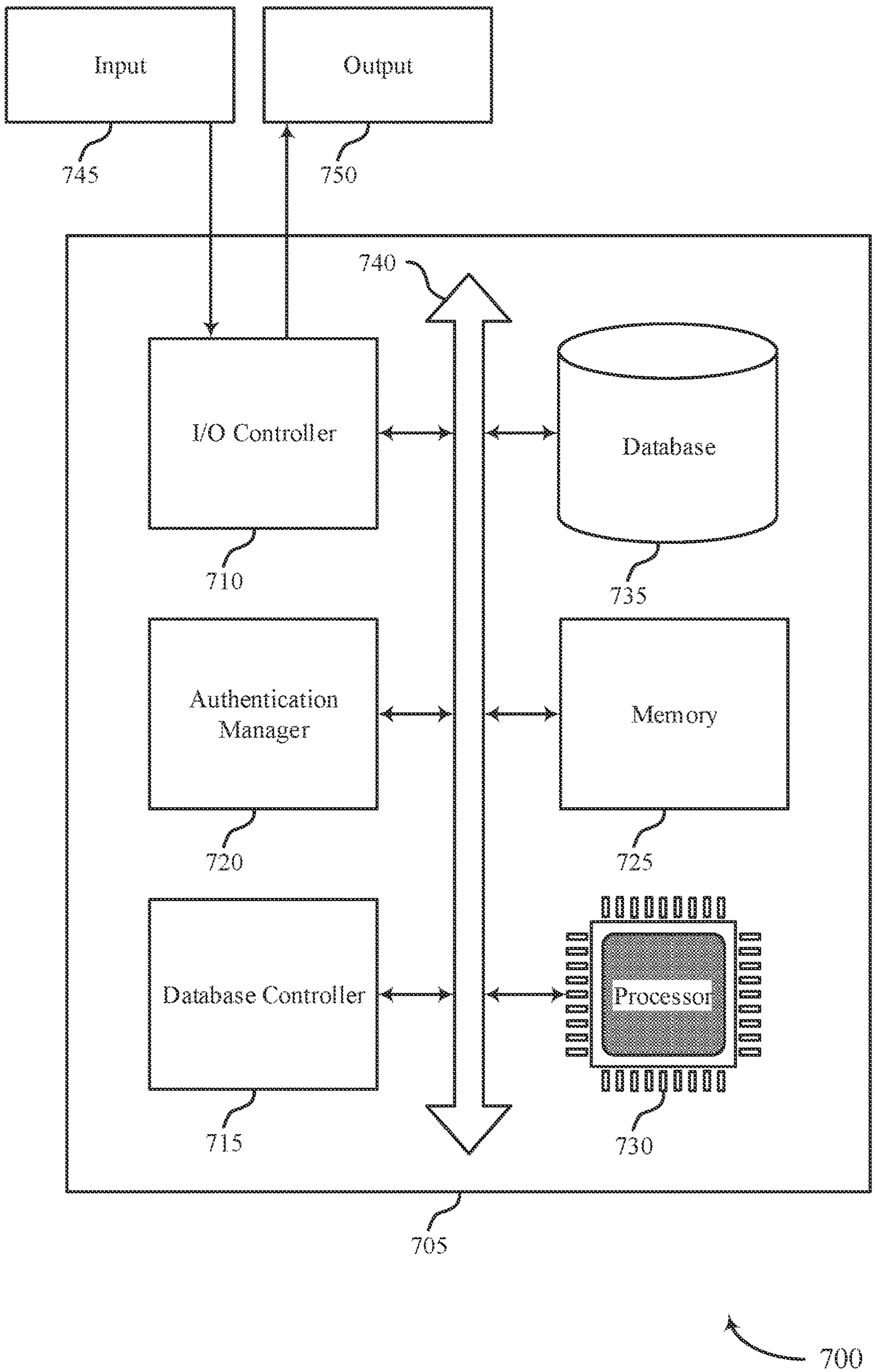
FIG. 7 shows a diagram of a system including a device that supports using hidden fields for bot detection in accordance with aspects of the present disclosure.

FIG. 7 shows a diagram of a system 700 including a device 705 that supports using hidden fields for bot detection in accordance with aspects of the present disclosure. The device 705 may be an example of or include components of a device 505, as described with reference to FIG. 5. The device 705 may include components for bi-directional data communications including components for transmitting and receiving communications, such as an authentication manager 720, an I/O controller 710, a database controller 715, at least one memory 725, at least one processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and read-only memory (ROM). The memory 725 may store computer-readable, computer-executable software including instructions that, when executed, cause at least one processor 730 to perform various functions described herein. In some cases, the memory 725 may contain, among other things, a basic I/O system (BIOS) which may control basic hardware or software operation such as the interaction with peripheral components or devices. The memory 725 may be an example of a single memory or multiple memories. For example, the device 705 may include one or more memories 725.

The processor 730 may include an intelligent hardware device (e.g., a general-purpose processor, a digital signal processor (DSP), a central processing unit (CPU), a micro-controller, an application-specific integrated circuit (ASIC), a field-programmable gate array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in at least one memory 725 to perform various functions (e.g., functions or tasks supporting using hidden fields for bot detection). The processor 730 may be an example of a single processor or multiple processors. For example, the device 705 may include one or more processors 730.

For example, the authentication manager 720 may be configured to or otherwise capable of receiving information associated with a request to access one or more resources that are protected by an identity management platform, the information including at least an IP address associated with the request. The authentication manager 720 may be configured to or otherwise capable of transmitting, to the IP address associated with the request, data corresponding to a login page associated with accessing the one or more resources, the data including one or more login fields that are detectable when the login page is rendered and at least one hidden field that is undetectable when the login page is rendered. The authentication manager 720 may be configured to or otherwise capable of receiving, from the IP address associated with the request, a login response including a first set of one or more inputs corresponding to the one or more login fields that are detectable when the login page is rendered and a second set of one or more inputs corresponding to the at least one hidden field that is undetectable when the login page is rendered. The authentication manager 720 may be configured to or otherwise capable of determining that the IP address associated with the request corresponds to an unauthorized entity based on the login response including the second set of one or more inputs for the at least one hidden field in the login page.

By including or configuring the authentication manager 720 in accordance with examples described herein, the device 705 may support techniques for improved bot detection. For example, incorporating hidden fields into login processes may enable the device 705 to detect unauthorized activity (i.e., bot traffic) with greater accuracy and consistency, thereby making the device 705 less susceptible to DDOS attacks, data breaches, credential stuffing attacks, automated login attempts, etc. Using hidden fields to distinguish legitimate traffic from illegitimate traffic may also reduce the number of unauthorized entities that are missed (i.e., not detected) by the device 705 and/or the number of legitimate users that are mistaken for unauthorized entities, thereby resulting in greater network security and improved user experience. Keeping track of IP addresses that fill out hidden fields (for data enrichment purposes) may improve the predictive accuracy of ML models that detect/identify suspicious network activity. Randomizing the location, type, and/or presence of hidden fields may prevent sophisticated attackers from guessing or circumventing the hidden fields.

Figure 8:
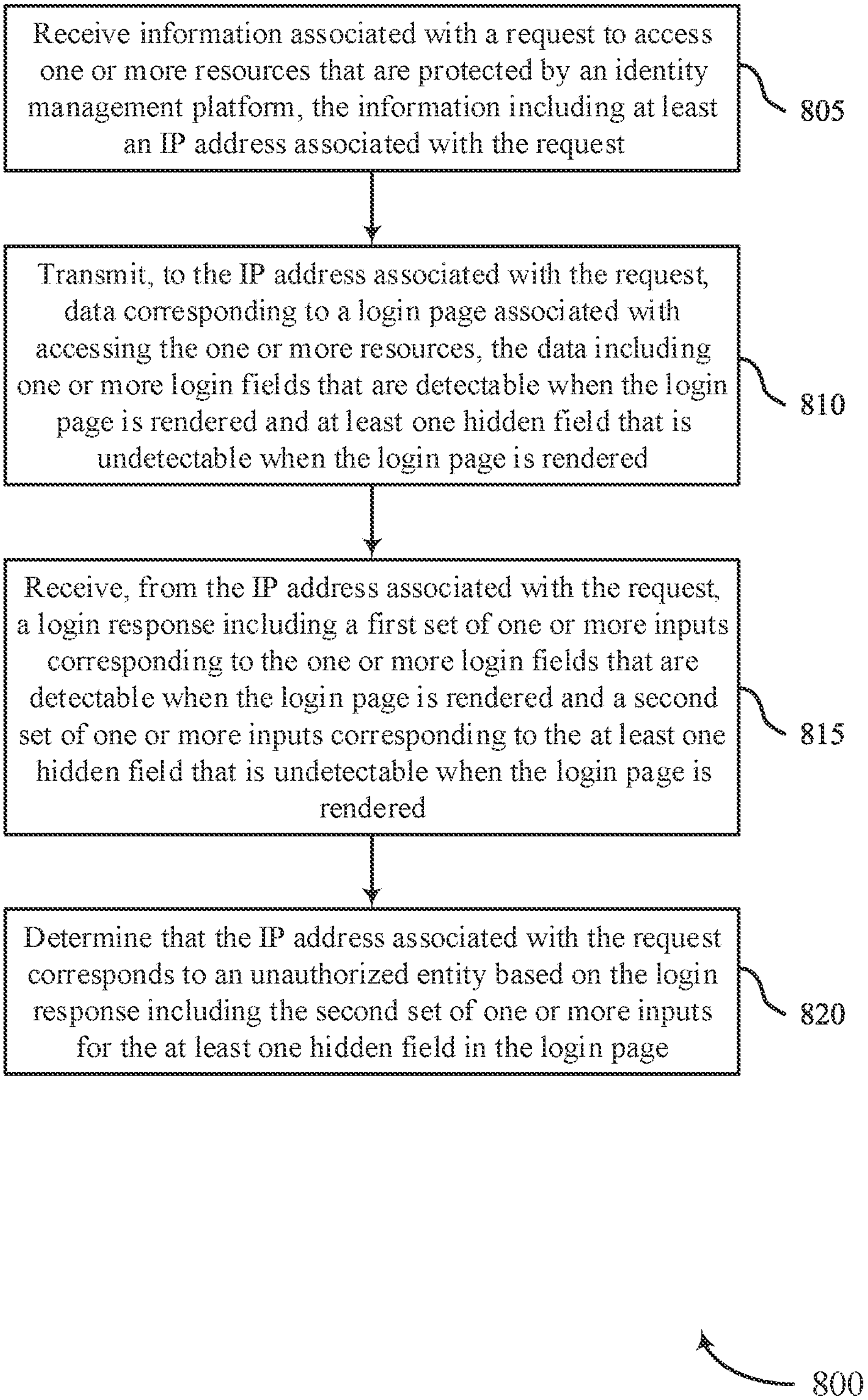
FIG. 8 shows a flowchart illustrating methods that support using hidden fields for bot detection in accordance with aspects of the present disclosure.

FIG. 8 shows a flowchart illustrating a method 800 that supports using hidden fields for bot detection in accordance with aspects of the present disclosure. The operations of the method 800 may be implemented by an identity management platform, such as the identity management platform 115 shown and described with reference to FIGS. 1 through 7. In some examples, the identity management platform may execute a set of instructions to control the functional elements of the identity management platform to perform the described functions. Additionally, or alternatively, the identity management platform may perform aspects of the described functions using special-purpose hardware.

At 805, the identity management platform may receive information associated with a request to access one or more resources that are protected by an identity management platform, the information including at least an IP address associated with the request. In some examples, aspects of the operations of 805 may be performed by a login request component 625, as described with reference to FIG. 6.

At 810, the identity management platform may transmit, to the IP address associated with the request, data corresponding to a login page associated with accessing the one or more resources, the data including one or more login fields that are detectable when the login page is rendered and at least one hidden field that is undetectable when the login page is rendered. In some examples, aspects of the operations of 810 may be performed by a hidden field component 630, as described with reference to FIG. 6.

At 815, the identity management platform may receive, from the IP address associated with the request, a login response including a first set of one or more inputs corresponding to the one or more login fields that are detectable when the login page is rendered and a second set of one or more inputs corresponding to the at least one hidden field that is undetectable when the login page is rendered. In some examples, aspects of the operations of 815 may be performed by a login response component 635, as described with reference to FIG. 6.

At 820, the identity management platform may determine that the IP address associated with the request corresponds to an unauthorized entity based on the login response including the second set of one or more inputs for the at least one hidden field in the login page. In some examples, aspects of the operations of 820 may be performed by a user detection component 640, as described with reference to FIG. 6.

A method is described. The method includes: receiving information associated with a request to access one or more resources that are protected by an identity management platform, the information including at least an IP address associated with the request; transmitting, to the IP address associated with the request, data corresponding to a login page associated with accessing the one or more resources, the data including one or more login fields that are detectable (e.g., viewable) when the login page is rendered and at least one hidden field that is undetectable (e.g., unviewable) when the login page is rendered; receiving, from the IP address associated with the request, a login response including a first set of one or more inputs corresponding to the one or more login fields that are detectable when the login page is rendered and a second set of one or more inputs corresponding to the at least one hidden field that is undetectable when the login page is rendered; and determining that the IP address associated with the request corresponds to an unauthorized entity based on the login response including the second set of one or more inputs for the at least one hidden field in the login page.

An apparatus is described. The apparatus includes one or more memories storing processor executable code, and one or more processors coupled with the one or more memories. The one or more processors are individually or collectively operable to execute the code to cause the apparatus to: receive information associated with a request to access one or more resources that are protected by an identity management platform, the information including at least an IP address associated with the request: transmit, to the IP address associated with the request, data corresponding to a login page associated with accessing the one or more resources, the data including one or more login fields that are detectable when the login page is rendered and at least one hidden field that is undetectable when the login page is rendered; receive, from the IP address associated with the request, a login response including a first set of one or more inputs corresponding to the one or more login fields that are detectable when the login page is rendered and a second set of one or more inputs corresponding to the at least one hidden field that is undetectable when the login page is rendered; and determine that the IP address associated with the request corresponds to an unauthorized entity based on the login response including the second set of one or more inputs for the at least one hidden field in the login page.

Another apparatus is described. The apparatus includes: means for receiving information associated with a request to access one or more resources that are protected by an identity management platform, the information including at least an IP address associated with the request; means for transmitting, to the IP address associated with the request, data corresponding to a login page associated with accessing the one or more resources, the data including one or more login fields that are detectable when the login page is rendered and at least one hidden field that is undetectable when the login page is rendered; means for receiving, from the IP address associated with the request, a login response including a first set of one or more inputs corresponding to the one or more login fields that are detectable when the login page is rendered and a second set of one or more inputs corresponding to the at least one hidden field that is undetectable when the login page is rendered; and means for determining that the IP address associated with the request corresponds to an unauthorized entity based on the login response including the second set of one or more inputs for the at least one hidden field in the login page.

A non-transitory computer-readable medium is described. The non-transitory computer-readable medium stores code that includes instructions executable by one or more processor to: receive information associated with a request to access one or more resources that are protected by an identity management platform, the information including at least an IP address associated with the request; transmit, to the IP address associated with the request, data corresponding to a login page associated with accessing the one or more resources, the data including one or more login fields that are detectable when the login page is rendered and at least one hidden field that is undetectable when the login page is rendered; receive, from the IP address associated with the request, a login response including a first set of one or more inputs corresponding to the one or more login fields that are detectable (e.g., viewable) when the login page is rendered and a second set of one or more inputs corresponding to the at least one hidden field that is undetectable (e.g., unviewable) when the login page is rendered; and determine that the IP address associated with the request corresponds to an unauthorized entity based on the login response including the second set of one or more inputs for the at least one hidden field in the login page.

In some examples, the at least one hidden field includes a CAPTCHA or a text field that may be undetectable when the login page may be rendered. In some examples, the at least one hidden field may be configured with one or more properties that cause the at least one hidden field to be undetectable (e.g., unviewable) when the login page may be rendered. In some examples, the at least one hidden field may be rendered outside a viewable frame of the login page.

Some examples may further include operations, features, means, or instructions for adding the IP address of the unauthorized entity to a set of untrusted IP addresses associated with the identity management platform. In some examples, the set of untrusted IP addresses maintained by the identity management platform includes one or more untrusted IP addresses provided by an external data source.

In some examples, determining that the IP address corresponds to the unauthorized entity may include operations, features, means, or instructions for using a machine learning model to predict whether the IP address associated with the request corresponds to an unauthorized entity.

In some examples, determining that the IP address corresponds to the unauthorized entity may include operations, features, means, or instructions for transmitting a CAPTCHA to the IP address based on a prediction that the IP address associated with the request corresponds to an unauthorized entity.

In some examples, a presence, location, and/or type of the at least one hidden field may be randomized for each login request. In some examples, the at least one hidden field may be undetectable to users with accessibility impairments or reading modifications.

Some examples may further include operations, features, means, or instructions for receiving, from a second IP address associated with a second request to access the one or more resources associated with the identity management platform, a second login response without an input for the at least one hidden field and determining that the second IP address may be valid based on the second login response excluding an input for the at least one hidden field.

The following provides an overview of aspects of the present disclosure:

Aspect 1: A method, comprising: receiving information associated with a request to access one or more resources that are protected by an identity management platform, the information comprising at least an IP address associated with the request; transmitting, to the IP address associated with the request, data corresponding to a login page associated with accessing the one or more resources, the data comprising one or more login fields that are detectable when the login page is rendered and at least one hidden field that is undetectable when the login page is rendered; receiving, from the IP address associated with the request, a login response comprising a first set of one or more inputs corresponding to the one or more login fields that are detectable when the login page is rendered and a second set of one or more inputs corresponding to the at least one hidden field that is undetectable when the login page is rendered; and determining that the IP address associated with the request corresponds to an unauthorized entity based at least in part on the login response including the second set of one or more inputs for the at least one hidden field in the login page.

Aspect 2: The method of aspect 1, wherein the at least one hidden field comprises a CAPTCHA or a text field that is undetectable when the login page is rendered.

Aspect 3: The method of any of aspects 1 through 2, wherein the at least one hidden field is configured with one or more properties that cause the at least one hidden field to be undetectable when the login page is rendered.

Aspect 4: The method of any of aspects 1 through 3, wherein the at least one hidden field is rendered outside a viewable frame of the login page.

Aspect 5: The method of any of aspects 1 through 4, further comprising: adding the IP address of the unauthorized entity to a set of untrusted IP addresses associated with the identity management platform.

Aspect 6: The method of aspect 5, wherein the set of untrusted IP addresses maintained by the identity management platform comprises one or more untrusted IP addresses provided by an external data source.

Aspect 7: The method of any of aspects 1 through 6, wherein determining that the IP address corresponds to the unauthorized entity comprises: using a machine learning model to predict whether the IP address associated with the request corresponds to an unauthorized entity.

Aspect 8: The method of any of aspects 1 through 7, wherein determining that the IP address corresponds to the unauthorized entity comprises: transmitting a CAPTCHA to the IP address based at least in part on a prediction that the IP address associated with the request corresponds to an unauthorized entity.

Aspect 9: The method of any of aspects 1 through 8, wherein a presence, location, or type of the at least one hidden field is randomized for each login request.

Aspect 10: The method of any of aspects 1 through 9, wherein the at least one hidden field is undetectable to users with accessibility impairments or reading modifications.

Aspect 11: The method of any of aspects 1 through 10, further comprising: receiving, from a second IP address associated with a second request to access the one or more resources associated with the identity management platform, a second login response without an input for the at least one hidden field: and determining that the second IP address is valid based at least in part on the second login response excluding an input for the at least one hidden field.

Aspect 12: An apparatus comprising one or more memories storing processor-executable code, and one or more processors coupled with the one or more memories and individually or collectively operable to execute the code to cause the apparatus to perform a method of any of aspects 1 through 11.

Aspect 13: An apparatus comprising at least one means for performing a method of any of aspects 1 through 11.

Aspect 14: A non-transitory computer-readable medium storing code, the code comprising instructions executable by one or more processors to individually or collectively perform a method of any of aspects 1 through 11.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:

receiving information associated with a request to access one or more resources that are protected by an identity management platform, the information comprising at least an Internet Protocol (IP) address associated with the request;

transmitting, to the IP address associated with the request, data corresponding to a login page associated with accessing the one or more resources, the data comprising one or more login fields that are detectable when the login page is rendered and at least one hidden field that is undetectable when the login page is rendered;

receiving, from the IP address associated with the request, a login response comprising a first set of one or more inputs corresponding to the one or more login fields that are detectable when the login page is rendered and a second set of one or more inputs corresponding to the at least one hidden field that is undetectable when the login page is rendered;

determining that the IP address associated with the request corresponds to an unauthorized entity based at least in part on the login response including the second set of one or more inputs for the at least one hidden field in the login page; and adding the IP address of the unauthorized entity to a set of untrusted IP addresses maintained by the identity management platform, wherein the set of untrusted IP addresses comprises one or more untrusted IP addresses provided by an external data source.

2. The method of claim 1, wherein the at least one hidden field comprises a CAPTCHA or a text field that is undetectable when the login page is rendered.

3. The method of claim 1, wherein the at least one hidden field is configured with one or more properties that cause the at least one hidden field to be undetectable when the login page is rendered.

4. The method of claim 1, wherein the at least one hidden field is rendered outside a viewable frame of the login page.

5. The method of claim 1, wherein determining that the IP address corresponds to the unauthorized entity comprises:

using a machine learning model to predict whether the IP address associated with the request corresponds to an unauthorized entity.

6. The method of claim 1, wherein determining that the IP address corresponds to the unauthorized entity comprises:

transmitting a CAPTCHA to the IP address based at least in part on a prediction that the IP address associated with the request corresponds to an unauthorized entity.

7. The method of claim 1, wherein a presence, location, or type of the at least one hidden field is randomized for each login request.

8. The method of claim 1, wherein the at least one hidden field is undetectable to users with accessibility impairments or reading modifications.

9. The method of claim 1, further comprising:

receiving, from a second IP address associated with a second request to access the one or more resources associated with the identity management platform, a second login response without an input for the at least one hidden field; and determining that the second IP address is valid based at least in part on the second login response excluding an input for the at least one hidden field.

10. The method of claim 1, wherein an authorized entity omits the second set of one or more inputs corresponding to the at least one hidden field.

11. An apparatus, comprising:

one or more memories storing code; and one or more processors coupled with the one or more memories and individually or collectively operable to execute the code to cause the apparatus to:

receive information associated with a request to access one or more resources that are protected by an identity management platform, the information comprising at least an Internet Protocol (IP) address associated with the request;

transmit, to the IP address associated with the request, data corresponding to a login page associated with accessing the one or more resources, the data comprising one or more login fields that are detectable when the login page is rendered and at least one hidden field that is undetectable when the login page is rendered;

receive, from the IP address associated with the request, a login response comprising a first set of one or more inputs corresponding to the one or more login fields that are detectable when the login page is rendered and a second set of one or more inputs corresponding to the at least one hidden field that is undetectable when the login page is rendered;

determine that the IP address associated with the request corresponds to an unauthorized entity based at least in part on the login response including the second set of one or more inputs for the at least one hidden field in the login page; and add the IP address of the unauthorized entity to a set of untrusted IP addresses maintained by the identity management platform, wherein the set of untrusted IP addresses comprises one or more untrusted IP addresses provided by an external data source.

12. The apparatus of claim 11, wherein the at least one hidden field comprises a CAPTCHA or a text field that is undetectable when the login page is rendered.

13. The apparatus of claim 11, wherein the at least one hidden field is configured with one or more properties that cause the at least one hidden field to be undetectable when the login page is rendered.

14. The apparatus of claim 11, wherein the at least one hidden field is rendered outside a viewable frame of the login page.

15. The apparatus of claim 11, wherein, to determine that the IP address corresponds to the unauthorized entity, the one or more processors are individually or collectively operable to execute the code to cause the apparatus to:

used a machine learning model to predict whether the IP address associated with the request corresponds to an unauthorized entity.

16. A non-transitory computer-readable medium that stores code comprising instructions executable by one or more processors to:

receive information associated with a request to access one or more resources that are protected by an identity management platform, the information comprising at least an Internet Protocol (IP) address associated with the request;

transmit, to the IP address associated with the request, data corresponding to a login page associated with accessing the one or more resources, the data comprising one or more login fields that are detectable when the login page is rendered and at least one hidden field that is undetectable when the login page is rendered;

receive, from the IP address associated with the request, a login response comprising a first set of one or more inputs corresponding to the one or more login fields that are detectable when the login page is rendered and a second set of one or more inputs corresponding to the at least one hidden field that is undetectable when the login page is rendered;

determine that the IP address associated with the request corresponds to an unauthorized entity based at least in part on the login response including the second set of one or more inputs for the at least one hidden field in the login page; and add the IP address of the unauthorized entity to a set of untrusted IP addresses associated with the identity management platform, wherein the set of untrusted IP addresses comprises one or more untrusted IP addresses provided by an external data source.

* * * * *